(12) United States Patent
Shinoda et al.

(10) Patent No.: US 8,535,773 B2
(45) Date of Patent: Sep. 17, 2013

(54) HOSE FOR TRANSPORTING REFRIGERANT

(75) Inventors: Yasuaki Shinoda, Oiwake (JP); Kazuto Yamakawa, Oiwake (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 13/701,493

(22) PCT Filed: May 31, 2011

(86) PCT No.: PCT/JP2011/062505
§ 371 (c)(1),
(2), (4) Date: Nov. 30, 2012

(87) PCT Pub. No.: WO2011/152407
PCT Pub. Date: Dec. 8, 2011

(65) Prior Publication Data
US 2013/0068338 A1 Mar. 21, 2013

(30) Foreign Application Priority Data
Jun. 2, 2010 (JP) .................. 2010-126713

(51) Int. Cl.
*B32B 1/08* (2006.01)
*B32B 25/00* (2006.01)

(52) U.S. Cl.
USPC ........................ 428/36.8; 428/35.7

(58) Field of Classification Search
USPC ............... 428/36.8, 35.7; 138/118, 137, 140
See application file for complete search history.

(56) References Cited

U.S. PATENT DOCUMENTS 7,485,677 B2 * 2/2009 Dias et al. ............... 524/445
2011/0186170 A1 8/2011 Oishi et al.

FOREIGN PATENT DOCUMENTS

| JP | 2000-220770 | 8/2000 |
| JP | 2003-268179 | 9/2003 |
| JP | 4365454 | 11/2009 |

OTHER PUBLICATIONS

International Search Report dated Aug. 16, 2011.

* cited by examiner

*Primary Examiner* — Michele L Jacobson
(74) *Attorney, Agent, or Firm* — Thorpe North & Western LLP

(57) ABSTRACT

A hose for transporting refrigerant of this invention is a hose comprising an inner tube layer including a gas barrier layer and a rubber layer adjacent to an outer surface of the gas barrier layer. The rubber layer comprises a rubber composition comprising from 1 to 15 parts by mass of an alkylphenol-formaldehyde resin and from 1 to 8 parts by mass of a hydrotalcite per 100 parts by mass of a raw rubber. The raw rubber comprises at least one selected from the group consisting of a BIMS and a butyl rubber and/or a halogenated butyl rubber, which is a copolymer rubber. The gas barrier layer comprises a polyamide resin composition comprising a modified polyamide obtained by blending a polyamide and a carboxyl group-containing modified polyolefin. The hose for transporting refrigerant of this invention has superior adhesion between the gas barrier layer and the rubber layer.

13 Claims, 16 Drawing Sheets

Table 1-1

| | | Comparative Example 1-1 | Comparative Example 1-2 | Comparative Example 2 | Working Example 1 | Comparative Example 3 | Working Example 2 |
|---|---|---|---|---|---|---|---|
| Rubber composition formulation | | | | | | | |
| IIR | Parts by mass | 100 | | | | | |
| Br-IIR | Parts by mass | | 100 | 100 | 100 | | |
| BIMS | Parts by mass | | | | | 100 | 100 |
| EPDM | Parts by mass | | | | | | |
| C.B (ISAF) | Parts by mass | | | 50 | 50 | 50 | 50 |
| C.B (HAF) | Parts by mass | 80 | 80 | | | | |
| St. Acid | Parts by mass | 3 | 3 | 2 | 2 | 2 | 2 |
| Hydrotalcite 1 (KW-2200) | Parts by mass | | | | 4 | | 4 |
| Paraffin oil | Parts by mass | 10 | 10 | 5 | 5 | 5 | 5 |

FIG. 2a

Table 1-1

| | | Comparative Example 1-1 | Comparative Example 1-2 | Comparative Example 2 | Working Example 1 | Comparative Example 3 | Working Example 2 |
|---|---|---|---|---|---|---|---|
| Rubber composition formulation | | | | | | | |
| Zinc stearate | Parts by mass | 2 | 2 | 2 | 2 | 2 | 2 |
| Brominated alkylphenol-formaldehyde resin | Parts by mass | 8 | 8 | 3 | 3 | 3 | 3 |
| Rubber Composition Extrusion Processability | | | | | | | |
| Minimum Mooney viscosity | N·m | 57.8 | 57.8 | 69.6 | 65.8 | 68.4 | 65 |
| Extrusion processability | | ○ | ○ | ○ | ○ | ○ | ○ |
| Rubber Composition Physical Properties | | | | | | | |
| TB | MPa | 9.2 | 9.2 | 13.2 | 12.2 | 11.4 | 10.7 |
| EB | % | 635 | 635 | 565 | 578 | 120 | 125 |
| M100 | Mpa | 2 | 2 | 2.5 | 2.3 | 10 | 10 |
| Hs | | 70 | 70 | 73 | 70 | 83 | 81 |
| Polyamide resin compositions 1 to 4 (type of gas barrier layer) | | 1 | 1 | 1 | 3 | 1 | 3 |

FIG. 2b

Table 1-1

| | | Comparative Example 1-1 | Comparative Example 1-2 | Comparative Example 2 | Working Example 1 | Comparative Example 3 | Working Example 2 |
|---|---|---|---|---|---|---|---|
| Modified polyamide | Parts by mass | 100 | 100 | 100 | 100 | 100 | 100 |
| Hydrotalcite 2 (KW-2200) | Parts by mass | | | | 4 | | 4 |
| Young's Modulus of the Polyamide Resin Composition | MPa | 230 | 230 | 230 | 245 | 230 | 245 |
| Young's modulus evaluation (○: 300 MPa or less) | | ○ | ○ | ○ | ○ | ○ | ○ |
| Adhesive strength of the rubber composition/polyamide resin composition | | | | | | | |
| Adhesive strength | N/25 mm | 79 | 35 | 43 | 78 | 29 | 52 |
| Adhesive strength evaluation (≥ 40 N/25 mm) | | ○ | × | ○ | ○ | × | ○ |
| Rubber sticking | Area proportion(%) | 90 | 0 | 100 | 100 | 100 | 100 |
| | Thickness | Thin | Interface | Thin | Thick | Thick | Thick |
| Rubber sticking evaluation | | × | × | × | ○ | ○ | ○ |
| Delamination | | × | × | × | ○ | × | ○ |

FIG. 2c

Table 1-2

| | | Comparative Example 4 | Working Example 3 | Working Example 4 | Working Example 5 | Comparative Example 5 |
|---|---|---|---|---|---|---|
| Rubber composition formulation | | | | | | |
| IIR | Parts by mass | | | | | |
| Br-IIR | Parts by mass | 32 | 32 | 32 | 32 | 32 |
| BIMS | Parts by mass | 13 | 13 | 13 | 13 | 13 |
| EPDM | Parts by mass | 55 | 55 | 55 | 55 | 55 |
| C.B (ISAF) | Parts by mass | 50 | 50 | 50 | 50 | 50 |
| C.B (HAF) | Parts by mass | | | | | |
| St. Acid | Parts by mass | 2 | 2 | 2 | 2 | 2 |
| Hydrotalcite 1 (KW-2200) | Parts by mass | | 2 | 4 | 8 | 10 |
| Paraffin oil | Parts by mass | 5 | 5 | 5 | 5 | 5 |

FIG. 3a

Table 1-2

| | | Comparative Example 4 | Working Example 3 | Working Example 4 | Working Example 5 | Comparative Example 5 |
|---|---|---|---|---|---|---|
| Rubber composition formulation | | | | | | |
| Zinc stearate | Parts by mass | 2 | 2 | 2 | 2 | 2 |
| Brominated alkylphenol-formaldehyde resin | Parts by mass | 3 | 3 | 3 | 3 | 3 |
| Rubber Composition Extrusion Processability | | | | | | |
| Minimum Mooney viscosity | N·m | 54.3 | 53.5 | 53.5 | 54.1 | 54.3 |
| Extrusion processability | | ○ | ○ | ○ | ○ | ○ |
| Rubber Composition Physical Properties | | | | | | |
| TB | MPa | 17.2 | 16.7 | 15.3 | 9.6 | 5.4 |
| EB | % | 380 | 391 | 395 | 440 | 470 |
| M100 | MPa | 4.5 | 4.4 | 4.1 | 3.3 | 2.8 |
| Hs | | 77 | 75 | 75 | 73 | 72 |
| Polyamide resin compositions 1 to 4 (type of gas barrier layer) | | 1 | 1 | 1 | 1 | 1 |

FIG. 3b

Table 1-2

| | | Comparative Example 4 | Working Example 3 | Working Example 4 | Working Example 5 | Comparative Example 5 |
|---|---|---|---|---|---|---|
| Modified polyamide | Parts by mass | 100 | 100 | 100 | 100 | 100 |
| Hydrotalcite 2 (KW-2200) | Parts by mass | | | | | |
| Young's Modulus of the Polyamide Resin Composition | MPa | 230 | 230 | 230 | 230 | 230 |
| Young's modulus evaluation (○: 300 MPa or less) | | ○ | ○ | ○ | ○ | ○ |
| Adhesive strength of the rubber composition/polyamide resin composition | | | | | | |
| Adhesive strength | N/25mm | 84 | 93 | 144 | 129 | 109 |
| Adhesive strength evaluation (≥ 40 N/25 mm) | | ○ | ○ | ○ | ○ | ○ |
| Rubber sticking | Area proportion(%) | 100 | 100 | 100 | 100 | 100 |
| | Thickness | Somewhat thick | Thick | Thick | Thick | Thick |
| Rubber sticking evaluation | | Δ | ○ | ○ | ○ | ○ |
| Delamination | | ○ | ○ | ○ | ○ | ○ |

FIG. 3c

Table 1-3

| | | Working Example 6 | Working Example 7 | Working Example 8 | Working Example 9 | Working Example 10 | Working Example 11 |
|---|---|---|---|---|---|---|---|
| Rubber composition formulation | | | | | | | |
| IIR | Parts by mass | | | | | | |
| Br-IIR | Parts by mass | 32 | 32 | 32 | 32 | 32 | 32 |
| BIMS | Parts by mass | 13 | 13 | 13 | 13 | 13 | 13 |
| EPDM | Parts by mass | 55 | 55 | 55 | 55 | 55 | 55 |
| C.B (ISAF) | Parts by mass | 50 | 50 | 50 | 50 | 50 | 50 |
| C.B (HAF) | Parts by mass | | | | | | |
| St. Acid | Parts by mass | 2 | 2 | 2 | 2 | 2 | 2 |
| Hydrotalcite 1 (KW-2200) | Parts by mass | 2 | 4 | 8 | 2 | 4 | 8 |
| Paraffin oil | Parts by mass | 5 | 5 | 5 | 5 | 5 | 5 |

FIG. 4a

Table 1-3

| | | Working Example 6 | Working Example 7 | Working Example 8 | Working Example 9 | Working Example 10 | Working Example 11 |
|---|---|---|---|---|---|---|---|
| Rubber composition formulation | | | | | | | |
| Zinc stearate | Parts by mass | 2 | 2 | 2 | 2 | 2 | 2 |
| Brominated alkylphenol-formaldehyde resin | Parts by mass | 3 | 3 | 3 | 3 | 3 | 3 |
| Rubber Composition Extrusion Processability | | | | | | | |
| Minimum Mooney viscosity | N·m | 53.5 | 53.5 | 54.1 | 53.5 | 53.5 | 54.1 |
| Extrusion processability | | ○ | ○ | ○ | ○ | ○ | ○ |
| Rubber Composition Physical Properties | | | | | | | |
| TB | MPa | 16.7 | 15.3 | 9.6 | 16.7 | 15.3 | 9.6 |
| EB | % | 391 | 395 | 440 | 391 | 395 | 440 |
| M100 | MPa | 4.4 | 4.1 | 3.3 | 4.4 | 4.1 | 3.3 |
| Hs | | 75 | 75 | 73 | 75 | 75 | 73 |
| Polyamide resin compositions 1 to 4 (type of gas barrier layer) | | 2 | 2 | 2 | 3 | 3 | 3 |

FIG. 4b

Table 1-3

| | | Working Example 6 | Working Example 7 | Working Example 8 | Working Example 9 | Working Example 10 | Working Example 11 |
|---|---|---|---|---|---|---|---|
| Modified polyamide | Parts by mass | 100 | 100 | 100 | 100 | 100 | 100 |
| Hydrotalcite 2 (KW-2200) | Parts by mass | | 2 | 2 | 4 | 4 | 4 |
| Young's Modulus of the Polyamide Resin Composition | MPa | 241 | 241 | 241 | 245 | 245 | 245 |
| Young's modulus evaluation (○: 300 MPa or less) | | ○ | ○ | ○ | ○ | ○ | ○ |
| Adhesive strength of the rubber composition/polyamide resin composition | | | | | | | |
| Adhesive strength | N/25mm | 99 | 136 | 132 | 116 | 151 | 124 |
| Adhesive strength evaluation (≥ 40 N/25 mm) | | ○ | ○ | ○ | ○ | ○ | ○ |
| Rubber sticking | Area proportion(%) | 100 | 100 | 100 | 100 | 100 | 100 |
| | Thickness | Thick | Thick | Thick | Thick | Thick | Thick |
| Rubber sticking evaluation | | ○ | ○ | ○ | ○ | ○ | ○ |
| Delamination | | ○ | ○ | ○ | ○ | ○ | ○ |

FIG. 4c

Table 1-4

| | | Working Example 12 | Working Example 13 | Working Example 14 | Comparative Example 6 |
|---|---|---|---|---|---|
| Rubber composition formulation | | | | | |
| IIR | Parts by mass | | | | |
| Br-IIR | Parts by mass | 32 | 32 | 32 | 32 |
| BIMS | Parts by mass | 13 | 13 | 13 | 13 |
| EPDM | Parts by mass | 55 | 55 | 55 | 55 |
| C.B (ISAF) | Parts by mass | 50 | 50 | 50 | 50 |
| C.B (HAF) | Parts by mass | | | | |
| St. Acid | Parts by mass | 2 | 2 | 2 | 2 |
| Hydrotalcite 1 (KW-2200) | Parts by mass | 2 | 4 | 8 | 0.5 |
| Paraffin oil | Parts by mass | 5 | 5 | 5 | 5 |

FIG. 5a

Table 1-4

| | | Working Example 12 | Working Example 13 | Working Example 14 | Comparative Example 6 |
|---|---|---|---|---|---|
| Rubber composition formulation | | | | | |
| Zinc stearate | Parts by mass | 2 | 2 | 2 | 2 |
| Brominated alkylphenol-formaldehyde resin | Parts by mass | 3 | 3 | 3 | 3 |
| Rubber Composition Extrusion Processability | | | | | |
| Minimum Mooney viscosity | N·m | 53.5 | 53.5 | 54.1 | 54 |
| Extrusion processability | | ○ | ○ | ○ | ○ |
| Rubber Composition Physical Properties | | | | | |
| TB | MPa | 16.7 | 15.3 | 9.6 | 17.1 |
| EB | % | 391 | 395 | 440 | 390 |
| M100 | MPa | 4.4 | 4.1 | 3.3 | 4.5 |
| Hs | | 75 | 75 | 73 | 77 |
| Polyamide resin compositions 1 to 4 (type of gas barrier layer) | | 4 | 4 | 4 | 1 |

FIG. 5b

Table 1-4

| | | Working Example 12 | Working Example 13 | Working Example 14 | Comparative Example 6 |
|---|---|---|---|---|---|
| Modified polyamide | Parts by mass | 100 | 100 | 100 | 100 |
| Hydrotalcite 2 (KW-2200) | Parts by mass | 8 | 8 | 8 | |
| Young's Modulus of the Polyamide Resin Composition | MPa | 252 | 252 | 252 | 230 |
| Young's modulus evaluation (○: 300 MPa or less) | | ○ | ○ | ○ | ○ |
| Adhesive strength of the rubber composition/polyamide resin composition | | | | | |
| Adhesive strength | N/25 mm | 110 | 99 | 109 | 84 |
| Adhesive strength evaluation (≧ 40 N/25 mm) | | ○ | ○ | ○ | ○ |
| Rubber sticking | Area proportion(%) | 100 | 100 | 100 | 100 |
| | Thickness | Thick | Thick | Thick | Somewhat thick |
| Rubber sticking evaluation | | ○ | ○ | ○ | △ |
| Delamination | | ○ | ○ | ○ | ○ |

FIG. 5c

Table 2

| | | Working Example 20 | Working Example 21 |
|---|---|---|---|
| Rubber composition formulation | | | |
| IIR | Parts by mass | | |
| Br-IIR | Parts by mass | 32 | 32 |
| BIMS | Parts by mass | 13 | 13 |
| EPDM | Parts by mass | 55 | 55 |
| C.B (ISAF) | Parts by mass | 50 | 50 |
| C.B (HAF) | Parts by mass | | |
| St. Acid | Parts by mass | 2 | 2 |
| Hydrotalcite 3 (DHT-4A) | Parts by mass | 4 | 4 |
| Paraffin oil | Parts by mass | 5 | 5 |

FIG. 6a

Table 2

| | | Working Example 20 | Working Example 21 |
|---|---|---|---|
| Rubber composition formulation | | | |
| Zinc stearate | Parts by mass | 2 | 2 |
| Brominated alkylphenol-formaldehyde resin | Parts by mass | 3 | 3 |
| Rubber Composition Extrusion Processability | | | |
| Minimum Mooney viscosity | N·m | 54 | 54 |
| Extrusion processability | | ○ | ○ |
| Rubber Composition Physical Properties | | | |
| TB | MPa | 16.2 | 16.2 |
| EB | % | 400 | 400 |
| M100 | MPa | 4.2 | 4.2 |
| Hs | | 75 | 75 |
| Polyamide resin compositions 1 and 5 (type of gas barrier layer) | | 1 | 5 |

FIG. 6b

Table 2

| | | Working Example 20 | Working Example 21 |
|---|---|---|---|
| Modified polyamide | Parts by mass | 100 | 100 |
| Hydrotalcite 4 (DHT-4A) | Parts by mass | | 4 |
| Young's Modulus of the Polyamide Resin Composition | MPa | 230 | 238 |
| Young's modulus evaluation (○: 300 MPa or less) | | ○ | ○ |
| Adhesive strength of the rubber composition/polyamide resin composition | | | |
| Adhesive strength | N/25mm | 95 | 106 |
| Adhesive strength evaluation (≥ 40 N/25 mm) | | ○ | ○ |
| Rubber sticking | Area proportion(%) | 100 | 100 |
| | Thickness | Thick | Thick |
| Rubber sticking evaluation | | ○ | ○ |
| Delamination | | ○ | ○ |

FIG. 6c

HOSE FOR TRANSPORTING REFRIGERANT

TECHNICAL FIELD

The present invention relates to a hose for transporting refrigerant.

BACKGROUND

In recent years, laminates of a resin and a rubber obtained by combining a resin material such as a polyamide or the like having low gas permeability and a rubber material have been conventionally used as hoses for transporting refrigerant used in car air conditioning systems and the like.

To date, the present applicant has proposed a hose in which a resin and a rubber are bonded without using an adhesive or the like (see Japanese Patent No. 4365454).

Additionally, Japanese Unexamined Patent Application Publication No. 2000-220770A describes a hose in which an innermost layer and an intermediate rubber layer are bonded without using a conventional adhesive.

However, as a result of diligent research, the present inventors found that there is still room to enhance adhesion when directly bonding a resin layer and a rubber layer.

SUMMARY

The present invention provides a hose having superior adhesion between a gas barrier layer and a rubber layer.

A hose for transporting refrigerant may comprise an inner tube layer including a gas barrier layer and a rubber layer adjacent to an outer surface of the gas barrier layer.

In such a hose for transporting refrigerant, the rubber layer comprises a rubber composition comprising from 1 to 15 parts by mass of an alkylphenol-formaldehyde resin and from 1 to 8 parts by mass of a hydrotalcite per 100 parts by mass of a raw rubber.

The raw rubber comprises at least one selected from the group consisting of a BIMS and a butyl rubber and/or a halogenated butyl rubber, which is a copolymer rubber.

The gas barrier layer comprises a polyamide resin composition comprising a modified polyamide obtained by blending a polyamide and a carboxyl group-containing modified polyolefin.

Specifically, the present invention provides the following 1 to 14.

1. A hose for transporting refrigerant comprising an inner tube layer including a gas barrier layer and a rubber layer adjacent to an outer surface of the gas barrier layer, wherein the rubber layer comprises a rubber composition comprising from 1 to 15 parts by mass of an alkylphenol-formaldehyde resin and from 1 to 8 parts by mass of a hydrotalcite per 100 parts by mass of a raw rubber;

the raw rubber comprises at least one selected from the group consisting of a BIMS and a butyl rubber and/or a halogenated butyl rubber, which is a copolymer rubber; and the gas barrier layer comprises a polyamide resin composition comprising a modified polyamide obtained by blending a polyamide and a carboxyl group-containing modified polyolefin.

2. The hose for transporting refrigerant described in 1, wherein the rubber composition further comprises from 30 to 80 parts by mass of a carbon black per 100 parts by mass of the raw rubber; and the carbon black has an $N_2SA$ that is greater than or equal to 75 $m^2/g$ and a DBP absorption number that is greater than or equal to 90 $cm^3/100$ g.

3. The hose for transporting refrigerant described in 1 or 2, wherein the raw rubber comprises a BIMS, a butyl rubber and/or a halogenated butyl rubber, which is a copolymer rubber and, also, an EPDM; and in the raw rubber, a content of the BIMS is from 5 to 40 parts by mass, a total of contents of the BIMS and the copolymer rubber is from 20 to 80 parts by mass, and a content of the EPDM is from 80 to 20 parts by mass.

4. The hose for transporting refrigerant described in any of 1 to 3, wherein the polyamide resin composition further comprises a hydrotalcite.

5. The hose for transporting refrigerant described in 4, wherein a content of the hydrotalcite comprised in the polyamide resin composition is from 0.5 to 20 parts by mass per 100 parts by mass of the modified polyamide.

6. The hose for transporting refrigerant described in any of 1 to 5, wherein the copolymer rubber is a halogenated butyl rubber.

7. The hose for transporting refrigerant described in any of 1 to 6, wherein the polyamide is at least one selected from the group consisting of polyamide 6, polyamide 11, polyamide 12, polyamide 4-6, polyamide 6-6, polyamide 6-10, polyamide 6-12, polyamide MXD-6, and copolymers of two or more of these.

8. The hose for transporting refrigerant described in any of 1 to 7, wherein the hydrotalcite comprised in the rubber composition is not surface treated.

9. The hose for transporting refrigerant described in any of 1 to 8, wherein the hydrotalcite comprised in the rubber composition is produced by calcining a raw hydrotalcite.

10. The hose for transporting refrigerant described in any of 1 to 9, wherein an adhesive layer is not interposed between the gas barrier layer and the rubber layer.

11. The hose for transporting refrigerant described in any of 1 to 10, wherein the gas barrier layer and the rubber layer are directly bonded.

12. The hose for transporting refrigerant described in any of 1 to 11, wherein a reinforcing layer is provided on the inner tube layer and an outer tube layer is provided on the reinforcing layer.

13. The hose for transporting refrigerant described in any of 4 to 12, wherein the hydrotalcite comprised in the polyamide resin composition is not surface treated.

14. The hose for transporting refrigerant described in any of 4 to 13, wherein the hydrotalcite comprised in the polyamide resin composition is produced by calcining a raw hydrotalcite.

Adhesion between the gas barrier layer and the rubber layer of the hose for transporting refrigerant of the present invention is superior.

BRIEF DESCRIPTION OF THE DRAWING

FIGS. 2a-2c illustrate Table 1-1, including test results for various hose examples.

FIGS. 3a-3c include Table 1-2, including test results for various hose examples.

FIGS. 4a-4c include Table 1-3, including test results for various hose examples.

FIGS. 5a-5c include Table 1-4, including test results for various hose examples.

FIGS. 6a-6c include Table 2, including test results for various hose examples.

DETAILED DESCRIPTION

Figure 1:
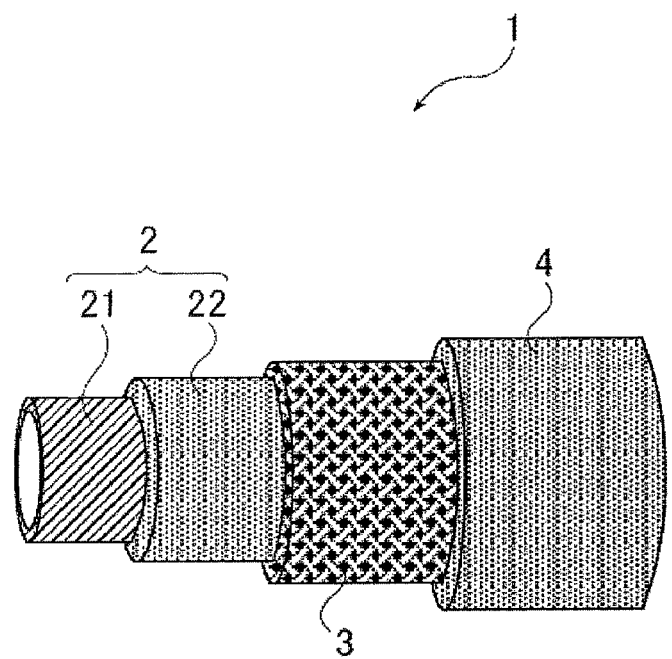
FIG. 1 is a perspective view of a preferable embodiment of a hose of the present invention.

The present invention is explained in detail below.

A hose for transporting refrigerant of the present invention is a hose comprising an inner tube layer including a gas barrier layer and a rubber layer adjacent to an outer surface of the gas barrier layer. The rubber layer comprises a rubber composition comprising from 1 to 15 parts by mass of an alkylphenol-formaldehyde resin and from 1 to 8 parts by mass of a hydrotalcite per 100 parts by mass of a raw rubber. The raw rubber comprises at least one selected from the group consisting of a BIMS and a butyl rubber and/or a halogenated butyl rubber, which is a copolymer rubber. The gas barrier layer comprises a polyamide resin composition comprising a modified polyamide obtained by blending a polyamide and a carboxyl group-containing modified polyolefin.

Hereinafter, the hose for transporting refrigerant of the present invention is also referred to as the "hose of the present invention".

The hose of the present invention is a hose for transporting refrigerant comprising an inner tube layer including a gas barrier layer and a rubber layer adjacent to an outer surface of the gas barrier layer. A layer formed from an adhesive is not interposed between the gas barrier layer and the rubber layer. The hose of the present invention includes cases in which the hose of the present invention is formed only from the inner tube layer and does not comprise other layers. Configurations of the hose of the present invention are described in detail hereinafter, but may also be the same as conventional hoses.

<Rubber Layer>

A description of the rubber layer is given below.

The rubber layer is formed using a rubber composition comprising from 1 to 15 parts by mass of the alkylphenol-formaldehyde resin and from 1 to 8 parts by mass of a hydrotalcite per 100 parts by mass of the raw rubber. The raw rubber comprises at least one selected from the group consisting of a BIMS and a butyl rubber and/or a halogenated butyl rubber, which is a copolymer rubber.

The hydrotalcite is a powerful halogen catcher. Therefore, the hydrotalcite can proactively extract halogens (e.g. chlorine atoms and bromine atoms) from the halides (e.g. halogenated butyl rubber, BIMS, and halogenated alkylphenol-formaldehyde resin) comprised in the rubber layer (rubber composition). As a result, an amount of reacting between carboxyl groups included in the carboxyl group-containing modified polyolefin in the gas barrier layer (polyamide resin composition) and the rubber layer (rubber composition) becomes greater than that in a case where a hydrotalcite is not comprised at an interface between the gas barrier layer and the rubber layer.

For this reason, it is thought that crosslinking density between the gas barrier layer and the rubber layer increases and adhesion between the gas barrier layer and the rubber layer is superior.

First, a description of the raw rubber will be given.

The raw rubber comprises at least one selected from the group consisting of a BIMS and a butyl rubber and/or a halogenated butyl rubber, which is a copolymer rubber. The raw rubber can be made crosslinkable by using a phenol-based resin.

Next, a description of the BIMS that the raw rubber can comprise will be given.

The BIMS is a brominated product of a copolymer rubber of a p-alkylstyrene and an isomonoolefin. Examples of the BIMS include a brominated product of a copolymer rubber of a p-alkylstyrene and an isomonoolefin having from 4 to 7 carbons, wherein a content of the p-alkylstyrene (PAS) is from 5 to 25 mass %, a content of bromine (Br) is not less than 1.5 mass %, and a mass ratio of the p-alkylstyrene unit to the bromine unit is such that $0.15 \leq Br/PAS \leq 0.40$. Specific examples thereof include brominated isobutylene-p-methylstyrene copolymer rubber. A Mooney viscosity (ML1+8, 125° C.) of the BIMS is not less than 30.

Examples of the isomonoolefin having from 4 to 7 carbons include isobutylene. Examples of the p-alkylstyrene include a styrene having an alkyl group having from 1 to 5 carbons at the para position such as p-methylstyrene, p-ethylstyrene, and the like. A content of the p-alkylstyrene (content of all those having the p-alkyl styrene backbone including those having the brominated alkyl group) in the BIMS is from 5 to 25 mass %, and preferably from 5 to 10 mass %. Refrigerant permeation resistance and the like will be superior if the content is 5 mass % or greater. Additionally, the rubber composition will not become brittle due to low temperature and low temperature resistance will be superior if the content is 25 mass % or less.

The BIMS is a commercially available product, and examples thereof include the EXXPRO series, manufactured by ExxonMobil Chemical Company. Specific examples include Exxpro 3745, manufactured by the same, which is a brominated product of a copolymer rubber of isobutylene and p-methylstyrene.

Next, a description of the copolymer rubber that the raw rubber can comprise will be given.

The copolymer rubber is a butyl rubber and/or a halogenated butyl rubber, and is preferably a halogenated butyl rubber, because the adhesion of the obtained hose of the present invention will be superior and durability will be enhanced.

The butyl rubber is not particularly limited and conventional isobutylene-isoprene rubber can be used, however a content of the isoprene as a degree of unsaturation is preferably from 0.6 to 2.5 mol %, and a molecular weight as a Mooney viscosity is preferably from 35 to 60 (at 125° C.)

Examples of the halogenated butyl rubber include chlorinated butyl rubber, brominated butyl rubber, and the like. Conventional halogenated butyl rubbers can be used as well, and when a chlorinated butyl rubber is used, a chlorine content is preferably from 1 to 2.5 mass %, the content of the isoprene as a degree of unsaturation is preferably from 0.6 to 2.5 mol %, and the molecular weight as the Mooney viscosity is preferably from 30 to 60 (at 125° C.). When a brominated butyl rubber is used, a bromine content is preferably from 1 to 2.5 mass %, the content of the isoprene as a degree of unsaturation is preferably from 0.6 to 2.5 mol %, and the molecular weight as the Mooney viscosity is preferably from 25 to 55 (at 125° C.)

The raw rubber can further comprise an ethylene propylene diene terpolymer (EPDM).

The EPDM that can be further comprised in the raw rubber is not particularly limited so long as it is a conventional copolymer rubber obtained by polymerizing monomer including ethylene, propylene, and a diene. Examples of commercially available products include Mitsui EPT-4070, manufactured by Mitsui Chemicals, Inc. A propylene content is preferably from 10 to 70 mol %, and more preferably from 15 to 50 mol %. Examples of the diene component include ethylidene norbornane, dicyclopentadiene, and 1,4-hexadiene. Among these, ethylidene norbornane, which has a high rate of crosslinking, is preferable. An amount of the diene component as an iodine value is preferably from 3 to 25, and more preferably from 5 to 20.

From the perspective of obtaining a superior balance between the adhesion between the gas barrier layer and the rubber layer and the gas barrier properties of the rubber layer itself, the combination of the raw rubber preferably comprises the BIMS, the butyl rubber and/or the halogenated butyl rubber, which is a copolymer rubber, and, furthermore, the EPDM.

From the perspective of obtaining superior adhesion between the gas barrier layer and the rubber layer, a content of the BIMS in the raw rubber is preferably from 5 to 40 parts by mass.

From the perspective of obtaining superior adhesion between the gas barrier layer and the rubber layer, a total of contents of the BIMS and the butyl rubber and/or the halogenated butyl rubber, which is a copolymer rubber, in the raw rubber is preferably from 20 to 80 parts by mass.

From the perspective of obtaining superior adhesion between the gas barrier layer and the rubber layer, a content of the EPDM in the raw rubber is preferably from 80 to 20 parts by mass.

If the content of the BIMS is less than 5 parts by mass, it will be difficult to obtain the necessary rubber sticking. In other words, it will be difficult to form an adhesive rubber layer having the necessary thickness on the surface of the gas barrier layer (rubber sticking is evaluated hereinafter). Likewise, if the content exceeds 40 parts by mass, it will be difficult to obtain the necessary adhesive strength. In other words, it will be difficult to firmly bond the rubber layer to the surface of the gas barrier layer.

Additionally, the content of the EPDM is more preferably from 70 to 50 parts by mass. If the content of the EPDM is less than 20 parts by mass, it will be difficult to obtain the necessary adhesive strength and rubber sticking. Likewise, if the content exceeds 80 parts by mass, the vulcanization rate will be slow, and productivity of the hose will decline.

Next, a description of the alkylphenol-formaldehyde resin will be given.

The alkylphenol-formaldehyde resin acts as a crosslinking agent of the raw rubber and crosslinks the raw rubber.

Alkylphenol-formaldehyde resins which have been halogenated (halogenated alkylphenol-formaldehyde resins) are also included in the alkylphenol-formaldehyde resin. Among these, from the perspective of obtaining superior adhesion between the gas barrier layer and the rubber layer, a halogenated alkylphenol-formaldehyde resin is preferable, and a brominated alkylphenol-formaldehyde resin is more preferable.

Examples of the alkylphenol-formaldehyde resin that can be used include commercially available products such as Tackirol 250-I, manufactured by Taoka Chemical Co., Ltd., and the like.

From the perspective of obtaining superior adhesion between the gas barrier layer and the rubber layer, a compounded amount of the alkylphenol-formaldehyde resin is from 1 to 15 parts by mass, preferably from 2 to 10 parts by mass, and more preferably from 2 to 7 parts by mass per 100 parts by mass of the raw rubber. If the compounded amount is less than 1 part by mass, it may be difficult to obtain the necessary adhesive strength. In other words, it may be difficult to firmly bond the rubber layer to the surface of the gas barrier layer. Likewise, if the compounded amount exceeds 15 parts by mass, physical properties (hardness) of the rubber layer may be hindered.

A description of the hydrotalcite is given below.

The hydrotalcite comprised in the rubber composition is not particularly limited. The hydrotalcite may be a natural or a synthetic hydrotalcite. Specifically:

$Mg_3ZnAl_2(OH)_{12}CO_3 \cdot wH_2O$ (where w is a positive real number);

$Mg_xAl_y(OH)_{2x+3y-2}CO_3 \cdot wH_2O$ (where x is from 1 to 10, y is from 1 to 10, and w is a positive real number); or $Mg_xAl_y(OH)_{2x+3y-2}CO_3$ (where x is from 1 to 10 and y is from 1 to 10; a specific example thereof being $Mg_{4.3}Al_2(OH)_{12.6}CO_3$; DHT-4A-2 (trade name); manufactured by Kyowa Chemical Industry Co., Ltd.; and $Mg_{1-x}Al_xO_{3.83x}$ (where $0.2 \leq x < 0.5$; a specific example thereof being $Mg_{0.7}Al_{0.3}O_{1.15}$; KW-2200 (trade name); manufactured by Kyowa Chemical Industry Co., Ltd.).

Among these hydrotalcites, from the perspectives of obtaining superior adhesion between the gas barrier layer and the rubber layer and high halogen catching capacity, hydrotalcites that have low OH contents (e.g. hydrotalcites free of hydrates and hydrotalcites free of the $wH_2O$ moiety in the formulas above) or $Mg_{1-x}Al_xO_{3.83x}$ are preferable, and $Mg_{0.7}Al_{0.3}O_{1.15}$ is more preferable. The hydrotalcite having a low OH content in the chemical structure can be produced, for example, by calcining (at an elevated temperature) a raw hydrotalcite (e.g. a hydrotalcite obtained via synthesis).

A commercially available product can be used as the hydrotalcite. Examples of commercially available hydrotalcites include the DHT series (DHT-4A, DHT-4A-2; grade that is produced by calcining, but not at a temperature as high as KW-2200 of the KW series, described below, and DHT-4C) manufactured by Kyowa Chemical Industry Co., Ltd., the KW series (grade produced by calcining the DHT series at a higher temperature than the DHT series that tends to have a higher halogen catching capacity than the DHT series; KW-2000, KW-2100, and KW-2200) also manufactured by Kyowa Chemical Industry Co., Ltd., and the STABIACE HT series manufactured by Sakai Chemical Industry Co., Ltd.

When the hydrotalcite is a synthetic hydrotalcite, a manufacturing method thereof may be a conventional method.

Hydrotalcites that have been surface treated and hydrotalcites that have not been surface treated (hydrotalcites with untreated surfaces) can be used as the hydrotalcite. Examples of a surface treating agent used when surface treating the hydrotalcite include fatty acids (including higher fatty acids) and fatty acid esters.

From the perspective of obtaining high halogen catching capacity of the hydrotalcite and superior adhesion between the gas barrier layer and the rubber layer, the hydrotalcite is preferably a hydrotalcite that has not been surface treated. Examples of commercially available hydrotalcites that are not surface treated include KW-2200 (manufactured by Kyowa Chemical Industry Co., Ltd.) and DHT-4C (manufactured by Kyowa Chemical Industry Co., Ltd.).

Additionally, from the perspective of obtaining superior mechanical physical properties of the rubber layer such as tensile strength ($T_B$; MPa), elongation at breaking ($E_B$; %), and 100% modulus ($M_{100}$), the hydrotalcite is preferably a surface treated hydrotalcite and more preferably a hydrotalcite that is surface treated with a higher fatty acid. Examples of commercially available hydrotalcites that are surface treated include DHT-4A (surface treated with a higher fatty acid; manufactured by Kyowa Chemical Industry Co., Ltd.), and DHT-4A-2 ($Mg_{4.3}Al_2(OH)_{12.6}CO_3$, surface treated with a higher fatty acid; manufactured by Kyowa Chemical Industry Co., Ltd.).

A single hydrotalcite can be used or a combination of two or more hydrotalcites can be used.

In the present invention, a content of the hydrotalcite comprised in the rubber composition is from 1 to 8 parts by mass per 100 parts by mass of the raw rubber. When within such a range, superior adhesion between the gas barrier layer and the rubber layer is obtained, and vulcanization time and the physical properties of the rubber layer will be within suitable ranges.

Additionally, from the perspectives of obtaining superior adhesion between the gas barrier layer and the rubber layer, and a vulcanization time of a suitable length, the content of the hydrotalcite is preferably from 2 to 6 parts by mass and more preferably from 2 to 4 parts by mass per 100 parts by mass of the raw rubber. From the perspectives of obtaining superior adhesion between the gas barrier layer and the rubber layer and superior reinforcement action of the rubber layer, the rubber composition preferably further comprises a carbon black.

From the perspectives of obtaining superior adhesion between the gas barrier layer and the rubber layer and superior reinforcement action of the rubber layer, colloidal characteristics of the carbon black used in the present invention are preferably such that an $N_2SA$ is greater than or equal to 75 $m^2/g$, and a DBP absorption number (Dibutyl phthalate absorption number) is greater than or equal to 90 $cm^3/100$ g. If the $N_2SA$ is less than 75 $m^2/g$ or the DBP absorption number is less than 90 $cm^3/100$ g, it will be difficult to firmly bond the rubber layer to the surface of the gas barrier layer.

The $N_2SA$ is preferably from 80 to 150 $m^2/g$ and more preferably from 80 to 120 $m^2/g$.

The DBP absorption number is preferably from 95 to 140 $cm^3/100$ g, and more preferably from 100 to 130 $cm^3/100$ g.

Here, "$N_2SA$" refers to the amount of nitrogen molecules adsorbed on the surface of the carbon black, and specifically refers to a value found by measuring according to the stipulations of JIS K 6217-2.

"DBP absorption number" refers to the amount of oil adsorbed in the aggregate of the carbon black, and specifically refers to a value found by measuring according to the stipulations of JIS K 6217-4.

Examples of the carbon black having an $N_2SA$ that is greater than or equal to 75 $m^2/g$ and a DBP absorption number greater than or equal to 90 $cm^3/100$ g include carbon blacks of a grade that is not lower than ISAF or HAF.

From the perspective of obtaining superior adhesion between the gas barrier layer and the rubber layer, a compounded amount of the carbon black is preferably from 30 to 80 parts by mass, and more preferably from 40 to 65 parts by mass per 100 parts by mass of the raw rubber. If the compounded amount is less than 30 parts by mass, it will be difficult to obtain the necessary adhesive strength. In other words, it will be difficult to firmly bond the rubber layer to the surface of the gas barrier layer. If the compounded amount exceeds 80 parts by mass, viscosity of the unvulcanized rubber will increase, which will lead to processability being hindered.

The rubber composition (rubber layer) may comprise crosslinking agents other than alkylphenol-formaldehyde resin, zinc oxide (ZnO), vulcanization aids, vulcanization accelerators, and additives in addition to the raw rubber, the alkylphenol-formaldehyde resin, the hydrotalcite, and the carbon black.

Examples of the vulcanization aids include fatty acids such as acetic acid, propionic acid, butanoic acid, stearic acid, acrylic acid, maleic acid, and the like; and zincs of fatty acids such as zinc acetate, zinc propionate, zinc butanoate, zinc stearate, zinc acrylate, zinc malate, and the like.

Examples of the vulcanization accelerator include thiuram-based vulcanization accelerators such as tetramethylthiuram disulfide (TMTD), tetraethylthiuram disulfide (TETD), and the like; aldehyde.ammonia-based vulcanization accelerators such as hexamethylene tetramine and the like; guanidine-based vulcanization accelerators such as diphenylguanidine and the like; thiazole-based vulcanization accelerators such as dibenzothiazyl disulfide (DM) and the like; and sulfenamide-based vulcanization accelerators such as cyclohexyl dibenzothiazyl sulfenamide and the like.

Examples of the additives include fillers such as clay, reinforcing agents other than carbon black, softeners such as paraffin oils and the like, plasticizers, processing aids, antidegradant agents, pigments, tackifiers, lubricants, dispersing agents, and the like.

A method for manufacturing the rubber composition is not particularly limited. Examples thereof include methods in which, as necessary, the carbon black and the additives described above are added to the RIMS, butyl rubber and/or halogenated butyl rubber and the EPDM, and mixed using a roll mixer, Banbury mixer, or the like and, thereafter, the alkylphenol-formaldehyde resin and hydrotalcites and, as necessary, the other zinc oxides, vulcanization aids, and vulcanization accelerators are added and mixed.

From the perspective of obtaining superior balance in strength with the adjacent member, the tensile strength ($T_B$) of the vulcanized sheet obtained from the resulting rubber composition is preferably not less than 6 MPa and more preferably from 8 to 25 MPa. The tensile strength ($T_B$) is measured according to the method described in the Working Examples. "Balance in strength with the adjacent member" refers to a balance of the strength of the rubber layer and the strength of the gas barrier layer adjacent to the rubber layer or the reinforcing layer or outer tube layer, which can be adjacent to the rubber layer. For example, as illustrated in the attached drawing FIG. 1, the gas barrier layer and the reinforcing layer are adjacent to the rubber layer in a hose having a gas barrier layer (resin)/rubber layer (hydrotalcite compound)/reinforcing layer (e.g. fiber or wire)/outer tube layer structure. In such a case, if the strength of the rubber layer is low (less than 6 MPa), the rubber layer will be sandwiched between a gas barrier layer and a reinforcing layer that are harder than the rubber layer. As a result, the rubber layer will easily fail in cases where the hose is subjected to fatigue such as repeated vibration. When the tensile strength ($T_B$) of the vulcanized sheet obtained from the rubber composition is within the range described above, the balance in strength with the adjacent member will be superior and, as a result, the rubber layer will not easily fail in cases where the hose is subjected to fatigue such as repeated vibration.

The rubber layer can be formed by extrusion molding the rubber composition into, for example, a tube shape.

A thickness of the rubber layer is not particularly limited, but is preferably from 0.5 to 3.0 mm.

<Gas Barrier Layer>

A description of the gas barrier layer is given below.

The gas barrier layer of the hose of the present invention comprises a polyamide resin composition comprising a modified polyamide obtained by blending a polyamide and a carboxyl group-containing modified polyolefin.

The polyamide used when producing the modified polyamide is not particularly limited. Particularly, from the perspective of obtaining superior refrigerant permeation resistance, the polyamide is preferably at least one selected from the group consisting of polyamide 6, polyamide 11, polyamide 12, polyamide 4-6, polyamide 6-6, polyamide 6-10, polyamide 6-12, polyamide MXD-6, and copolymers of two or more of these.

Examples of a preferable carboxyl group-containing modified polyolefin used when producing the modified polyamide include a modified polyolefin wherein from about 0.1 to 10 mol % of a functional group is introduced via graft polymerization of an acid anhydride such as maleic anhydride to a polyolefin which is a homopolymerized or copolymerized olefin such as ethylene, propylene, and the like or diene monomer such as butadiene, and the like.

From the perspective of obtaining superior adhesion between the gas barrier layer and the rubber layer, a blend ratio (mass ratio) of the polyamide to the carboxyl group-containing modified polyolefin is preferably from 90/10 to 50/50 and more preferably from 85/15 to 65/35. While flexibility of the hose of the present invention improves when a proportion of the carboxyl group-containing modified polyolefin is great, refrigerant permeation resistance may decline. Likewise, while refrigerant permeation resistance improves when the proportion is small, adhesion with the rubber layer and flexibility will tend to be inferior.

The modified polyamide is not particularly limited so long as it is obtained by blending the polyamide and the carboxyl group-containing modified polyolefin. The modified polyamide can be an alloy of the polyamide and the carboxyl group-containing modified polyolefin.

Examples of the modified polyamide include Zytel ST series products such as Zytel ST801, Zytel ST811, and Zytel ST811HS (manufactured by DuPont), which are thought to be produced by alloying polyamide 6 and a maleic anhydride-modified polyolefin.

The present invention includes cases where the polyamide resin composition comprises only the modified polyamide. The gas barrier layer can be formed using only the modified polyamide.

From the perspective of obtaining superior adhesion between the gas barrier layer and the rubber layer, the polyamide resin composition preferably further comprises a hydrotalcite.

The hydrotalcite that can be comprised in the polyamide resin composition is synonymous with the hydrotalcite comprised in the rubber composition. Examples of the hydrotalcite that can be comprised in the polyamide resin composition include the same hydrotalcites comprised in the rubber composition, that is, hydrotalcites that are surface treated and hydrotalcites that are not surface treated.

Among these hydrotalcites, from the perspectives of obtaining superior adhesion between the gas barrier layer and the rubber layer and high halogen catching capacity, hydrotalcites that have low OH contents or $Mg_{1-x}Al_xO_{3.83x}$ are preferable, and $Mg_{0.7}Al_{0.3}O_{1.15}$ is more preferable.

From the perspective of obtaining high halogen catching capacity of the hydrotalcite and superior adhesion between the gas barrier layer and the rubber layer, the hydrotalcite is preferably a hydrotalcite that has not been surface treated.

From the perspectives of obtaining superior flexibility (flexibility of the gas barrier layer and the hose body, low flexural rigidity of the hose itself, and good manageability in an engine room), and superior vibration non-transmission (vibration from a compressor used to compress the refrigerant does not easily transmit to a vehicle body side and effects of vibration and noise experienced in the vehicle are minimal), the hydrotalcite is preferably a surface treated hydrotalcite and more preferably a hydrotalcite that is surface treated with a higher fatty acid.

The hydrotalcite that can be comprised in the polyamide resin composition may be the same or different from the hydrotalcite comprised in the rubber composition. Examples of combinations of the hydrotalcite comprised in the rubber composition and the hydrotalcite that can be comprised in the polyamide resin composition (when these two constituents are separate, hereinafter the former is referred to as the "hydrotalcite comprised in the rubber composition" and the latter is referred to as the "hydrotalcite that can be comprised in the polyamide resin composition") include a combination in which both constituents are $Mg_xAl_y(OH)_{2x+3y-2}CO_3 \cdot wH_2O$, a combination in which both constituents are hydrotalcites that have low OH content, a combination in which both constituents are $Mg_{1-x}Al_xO_{3.83x}$, a combination in which both constituents are surface treated, a combination in which both constituents are not surface treated, a combination of $Mg_xAl_y(OH)_{2x+3y-2}CO_3 \cdot wH_2O$ and $Mg_{1-x}Al_xO_{3.83x}$, a combination of $Mg_{1-x}Al_xO_{3.83x}$ and $Mg_xAl_y(OH)_{2x+3y-2}CO_3 \cdot wH_2O$, a combination of a hydrotalcite that is surface treated and a hydrotalcite that is not surface treated, and a combination of a hydrotalcite that is not surface treated and a hydrotalcite that is surface treated.

From the perspectives of obtaining superior adhesion between the gas barrier layer and the rubber layer, superior flexibility (flexibility of the gas barrier layer and the hose body, low flexural rigidity of the hose itself, and good manageability in an engine room), and superior vibration non-transmission (vibration from a compressor used to compress the refrigerant does not easily transmit to a vehicle body side and effects of vibration and noise experienced in the vehicle are minimal), a content of the hydrotalcite comprised in the polyamide resin composition is preferably from 0.5 to 20 parts by mass per 100 parts by mass of the modified polyamide.

Additionally, from the perspectives of obtaining superior adhesion between the gas barrier layer and the rubber layer, superior flexibility, superior vibration non-transmission, and an excellent balance between the adhesion, flexibility, and vibration non-transmission, the content of the hydrotalcite comprised in the polyamide resin composition is preferably from 1 to 15 parts by mass, more preferably from 2 to 15 parts by mass, even more preferably from 3 to 15 parts by mass, and yet even more preferably from 3 to 8 parts by mass per 100 parts by mass of the modified polyamide.

From the perspectives of obtaining superior adhesion between the gas barrier layer and the rubber layer, superior flexibility, superior vibration non-transmission, and an excellent balance between the adhesion, flexibility, and vibration non-transmission, in cases where the polyamide resin composition comprises the hydrotalcite, a total content of the hydrotalcite comprised in the rubber composition and the hydrotalcite comprised in the polyamide resin composition is preferably from 0.75 to 14 parts by mass and more preferably from 2 to 8 parts by mass per 100 parts by mass of a total content of the raw rubber and the modified polyamide.

From the perspectives of obtaining superior adhesion between the gas barrier layer and the rubber layer, superior flexibility, superior vibration non-transmission, and an excellent balance between the adhesion, flexibility, and vibration non-transmission, in cases where the polyamide resin composition comprises the hydrotalcite, a mass ratio (rubber composition:polyamide composition) of the hydrotalcite comprised in the rubber composition to the hydrotalcite comprised in the polyamide resin composition is preferably (1 to 8):(0.5 to 20) and more preferably (3 to 8):(2 to 10).

The polyamide resin composition can comprise additives as desired, as long as the object of the present invention is not hindered. Examples of additives include fillers, reinforcing agents, antidegradant agents, plasticizers, pigments (dyes), tackifiers, lubricants, dispersing agents, and processing aids.

A manufacturing method of the polyamide resin composition is not particularly limited. Examples thereof include a method wherein the modified polyamide and the hydrotalcite, and, as required, the additives, are mixed using a twin screw kneader extruder.

From the perspective of achieving superior mixing processability, a mixing temperature is preferably from 180 to 300° C. and more preferably from 200 to 280° C.

A Young's modulus of a hardened product (e.g. a sheet) formed from the polyamide resin composition is preferably 300 MPa or less and more preferably 270 MPa or less.

When the Young's modulus of the hardened product is 300 MPa or less, flexibility and vibration non-transmission will be superior. If the Young's modulus of the hardened product exceeds 300 MPa, the flexural rigidity of the hose itself will increase, manageability in an engine room will decline, vibration from a compressor used to compress the refrigerant will transfer to a vehicle body side, and problems related to vibration and noise will easily occur.

In the present invention, the Young's modulus of the hardened product can be configured to be 300 MPa or less by setting the amount of the hydrotalcite to be from 0.5 to 20 parts by mass per 100 parts by mass of the modified polyamide.

In the present invention, the Young's modulus is measured in accordance with Japan Industry Standard (JIS) K 7161 as follows. A sheet is fabricated using the polyamide resin composition at a temperature of 230° C. A sample is cut from the sheet having the following dimensions: 5 mm (width)×80 mm (length)×0.15 mm (thickness) and this was used as a sample (the sample described in the Working Examples). A tensile speed at which the Young's modulus was measured is 50 mm/minute.

The gas barrier layer can be formed by extrusion molding the polyamide resin composition into, for example, a tube shape.

A thickness of the gas barrier layer is not particularly limited but is preferably from 0.01 to 0.50 mm, more preferably from 0.05 to 0.30 mm, and even more preferably from 0.05 to 0.20 mm. When the thickness is within this range, moldability, refrigerant permeation resistance, and flexibility tend to be better.

The hose of the present invention comprises an inner tube layer including a gas barrier layer and a rubber layer adjacent to an outer surface of the gas barrier layer. The gas barrier layer and the rubber layer are adjacent to each other and can be directly bonded to each other. Therefore, there is no need to interpose an adhesive layer between the gas barrier layer and the rubber layer.

If the inner tube layer is not formed from the rubber layer and the gas barrier layer that comprise the specific components at the specific amounts described above, the gas barrier layer and the rubber layer cannot be firmly vulcanization (crosslink) bonded without using an adhesive. In other words, high adhesion (high adhesive strength and high rubber sticking) cannot be obtained.

An inner diameter, an outer diameter, and a length of the hose of the present invention are not particularly limited.

However, for example, the inner diameter of the hose is preferably from 5 to 20 mm and the more preferably from 7 to 17 mm.

So long as the hose of the present invention comprises the inner tube layer, it may also further comprise a reinforcing layer and/or an outer tube layer.

An example of a preferable form of the hose of the present invention is one in which a reinforcing layer is provided on the inner tube layer, and an outer tube layer is provided on the reinforcing layer.

The reinforcing layer is not particularly limited and may be a layer formed having a blade shape or a layer formed having a spiral shape. Examples of materials that can be used for the reinforcing layer include thread, wire, and the like. Examples of reinforcing threads include threads formed from vinylon fibers, rayon fibers, polyester fibers, nylon fibers, aromatic polyamide fibers, and the like. Additionally, examples of reinforcing wires include hard steel wires, specifically brass-plated wires or zinc-plated wires that provide anti-rust and adhesion imparting characteristics.

The outer tube layer is formed on an outer side of the inner tube layer and/or the reinforcing layer, and the material, structure, thickness, and the like are not particularly limited. Conventionally used rubber compositions, resins, metal wires, and the like can be used for the outer tube layer. The same rubber composition used for the rubber layer of the inner tube layer can be used as the rubber composition. Other than the alkylphenol-formaldehyde resin, the rubber composition may comprise crosslinking agents, fillers, reinforcing agents, plasticizers, antidegradant agents, vulcanization accelerators, softeners, tackifiers, lubricants, dispersing agents, process aids, and the like as desired. Examples of the resin include polyamide resins, polyester resins, polyurethane resins, polyacetal resins, vinyl chloride resins, polypropylene, polyethylene, and the like. Additionally, in order to enhance vibration absorbency via increasing weight and/or enhance strength, the outer tube layer can include metal and/or fiber to the extent that flexibility of the hose can still be ensured and vibration non-transmission is not hindered. For example, the outer tube layer can be configured so as to be solid or sponge-like. Moreover, the outer tube layer can be configured to be tube-like, and used by inserting the hose of the present invention therein; or can be configured so as to be spiral or spring-like, and used by being wrapped around the hose of the present invention.

The thickness of the outer tube layer is preferably from 1 to 5 mm, more preferably from 0.5 to 3 mm, and even more preferably from 1 to 2 mm.

The outer tube layer may be formed from a plurality of layers.

Next, a description of the structure of the hose of the present invention will be given while referring to the attached drawing. Note that the present invention is not limited to the attached drawing.

FIG. 1 is a drawing illustrating a preferable embodiment of the hose of the present invention.

In FIG. 1, a hose of the present invention 1 comprises an inner tube layer 2 including a gas barrier layer 21 and a rubber layer 22 adjacent to an outer surface of the gas barrier layer 21. An adhesive layer is not interposed between the gas barrier layer 21 and the rubber layer 22. However, in the present invention, because the rubber layer 22 comprises a hydrotalcite, the gas barrier layer 21 and the rubber layer 22 can be firmly bonded together.

In this preferable embodiment, a reinforcing layer 3 is provided on a top surface of the rubber layer 22 and, furthermore, an outer tube layer 4 is provided on a top surface of the reinforcing layer 3. The hose of the present invention may only comprise the inner tube layer 2.

The hose of the present invention is not particularly limited so long as it comprises the inner tube layer 2, and may further comprise another layer on an outer side of the outer tube layer 4 of the preferable embodiment illustrated in FIG. 1.

While it is not necessary that the hose of the present invention comprises the reinforcing layer described above, it is preferable that the reinforcing layer is comprised because the tensile breaking strength, usable range of pressure, and attachability of fittings of the hose will be enhanced. Particularly, when the hose of the present invention is used to transport high-pressure fluids, the reinforcing layer is preferably comprised.

A description of a method for manufacturing the hose of the present invention is given below.

The method for manufacturing the hose of the present invention is not particularly limited and a conventionally known method can be used. Examples thereof include methods in which the hose of the present invention is obtained by forming the gas barrier layer and the rubber layer by respective extrusion, or by coextrusion. Here, it is sufficient that the rubber layer be formed using the rubber composition described above. Moreover, it is sufficient that the gas barrier layer be formed using the polyamide resin composition described above. For example, in the case of the hose of the preferable embodiment illustrated in FIG. 1 described above, the hose of the present invention is obtained by laminating the rubber layer on the outer surface of the gas barrier layer, then laminating the reinforcing layer thereon by braiding or spiral winding, and finally laminating the outer tube layer (outer side rubber layer); and, thereafter, vulcanizing the entire laminated body. The vulcanization (crosslinking) can be performed at a temperature from about 150° C. to 180° C.

An example of another method for manufacturing includes a method in which the hose is manufactured by sequentially laminating the gas barrier layer, the rubber layer, the reinforcing layer, and the outer tube layer on a mandrel and, thereafter, vulcanization bonding the laminate on the mandrel for from 30 to 180 minutes at a temperature of from 140° C. to 190° C. by press vulcanization, steam vulcanization, oven vulcanization (dry heat vulcanization), or hot water vulcanization.

Because the hose of the present invention has superior adhesion between the gas barrier layer and the rubber layer, retention of gases and liquids at the bonding interface between the gas barrier layer and the rubber layer, which leads to bulging of the gas barrier at that portion, will not occur. Additionally, with the hose of the present invention, because it is not necessary to use an adhesive or the like to bond the gas barrier layer and the rubber layer, the adverse impact on the environment due to solvents included in the adhesive will be eliminated, and costs can be reduced as a result of reducing the manufacturing processes of the hose.

The refrigerant-containing composition that can be used in the hose of the present invention is not particularly limited. Examples thereof include compositions including a refrigerant such as fluorine-based compounds and a lubricant.

Examples of the refrigerant-containing composition include fluorine-based compounds with double bond (one or more double bonds) such as 2,3,3,3-tetrafluoropropene (structural formula: $CF_3—CF=CH_2$, HFO-1234yf); and saturated hydrofluorocarbons such as HFC-134a (structural formula: $CF_3—CFH_2$).

The lubricating oil included in the refrigerant-containing composition is not particularly limited. Examples thereof include conventionally known products.

The hose of the present invention can be used to transport a refrigerant, and, for example, can be used as a hose for transporting fluids such as a hose for use in air conditioning systems (e.g. car air conditioning systems). Additionally, the hose of the present invention can be used, for example, as a hose for transporting hot water (temperature regulator use) in addition to being usable as a hose for use in air conditioning systems.

WORKING EXAMPLES

A description of the hose of the present invention is given below using working examples, but the present invention is not limited to these working examples.

<Production of the Rubber Composition>

Components shown below (with the exception of the brominated alkylphenol-formaldehyde resin, the zinc stearate, and the hydrotalcite) were used at the amounts (parts by mass) shown in each of the Tables (in FIGS. 2a-6c) and were mixed using a roll or Banbury mixer. Thereafter, the brominated alkylphenol-formaldehyde resin, the zinc stearate, and the hydrotalcite were added at the amounts (parts by mass) shown in each of the Tables and mixed, and the rubber composition was produced.

Butyl rubber (IIR): EXXON BUTYL 268, manufactured by Japan Butyl Co., Ltd.

Brominated butyl rubber (Br-IIR): EXXON BROMOBUTYL 2255, manufactured by Japan Butyl Co., Ltd.

BIMS: Exxpro 3745, manufactured by ExxonMobil Chemical Company

EPDM: Mitsui EPT4070, manufactured by Mitsui Chemicals, Inc.

Carbon black [C.B. (ISAF)]: Shoblack N220, manufactured by Showa Cabot K.K. Carbon black having an $N_2SA$ that is greater than or equal to 75 $m^2/g$ and a DBP absorption number that is greater than or equal to 90 $cm^3/100$ g.

Carbon black [C.B. (HAF)]: Shoblack N330, manufactured by Showa Cabot K.K. Carbon black having an $N_2SA$ that is greater than or equal to 75 $m^2/g$ and a DBP absorption number that is greater than or equal to 90 $cm^3/100$ g.

Stearic acid (St. Acid): Lunac YA, manufactured by Kao Corporation

Hydrotalcite 1: KW-2200, manufactured by Kyowa Chemical Industry Co., Ltd. $Mg_{0.7}Al_{0.3}O_{1.15}$, baked, not surface treated.

Hydrotalcite 3: DHT-4A, manufactured by Kyowa Chemical Industry Co., Ltd. $Mg_{4.5}Al_2(OH)_{13}CO_3.3.5H_2O$, surface treated with higher fatty acid. Not baked Paraffin oil: Process Oil 123, manufactured by Showa Shell Sekiyu K.K.

Zinc stearate: Zinc stearate, manufactured by Seido Chemical Industry Ltd.

Brominated alkylphenol-formaldehyde resin: Tackirol 250-I, manufactured by Taoka Chemical Co., Ltd.

<Production of the Polyamide Resin Composition>

Polyamide resin compositions 2 to 5 were produced by uniformly mixing the components shown below in each of the Tables (in FIGS. 2a-6c) at the amounts (parts by mass) also shown in each of the Tables using a twin screw kneader extruder. Note that, for polyamide resin composition 1, 100 parts by mass of a modified polyamide (an alloy of polyamide 6 and a carboxyl group-containing modified polyolefin), Zytel® ST811HS, manufactured by DuPont, was used.

Modified polyamide: Alloy of polyamide 6 and a carboxyl group-containing modified polyolefin, Zytel® ST811HS, manufactured by DuPont Hydrotalcite 2: KW-2200, manufactured by Kyowa Chemical Industry Co., Ltd. $Mg_{0.7}Al_{0.3}O_{1.15}$, baked, not surface treated.

Hydrotalcite 4: DHT-4A, manufactured by Kyowa Chemical Industry Co., Ltd. $Mg_{4.5}Al_2(OH)_{13}CO_3.3.5H_2O$, surface treated with higher fatty acid, not baked.

<Evaluation>

Tests were performed and evaluations conducted for rubber composition extrusion processability, rubber composition physical properties, Young's modulus of the polyamide resin composition, adhesive strength of the rubber composition/polyamide resin composition, and delamination according to the methods described below. The results are shown in each of the Tables (in FIGS. 2a-6c).

Rubber Composition Extrusion Processability

A minimum Mooney viscosity of each of the rubber compositions obtained as described above was measured. "Minimum Mooney viscosity" refers to a value (Vm) measured at 125° C. in a Mooney scorch test according to JIS K 6300-1.

Additionally, a head having a rounded-rod shape was attached to a small screw extruder (compression-type screw used) and extrudability where a temperature of the head and the cylinder was 80° C. and the rotation speed was 60 rpm was confirmed. Those products that had a form (visual appearance, etc.) of a level usable as a hose were evaluated as "o" and those that were not of a usable level were evaluated as "x".

Rubber Composition Physical Properties

Using a press molding machine, each of the rubber compositions obtained as described above was vulcanized for 45 minutes under a surface pressure of 3.0 MPa at 150° C. Thus, a vulcanized sheet having a thickness of 2 mm was fabricated. JIS No. 3 dumbbell-shaped test pieces were cut-out of these sheets and tensile tests were conducted in accordance with JIS K6251 at a tensile speed of 500 mm/minute. Tensile strength ($T_B$) [MPa], elongation at breaking ($E_B$) [%], and 100% modulus ($M_{100}$) [MPa] were measured at room temperature.

In the present invention, tensile strength ($T_B$) that was not less than 6 MPa was deemed suitable for the hose for transporting refrigerant.

Additionally, hardness ($H_S$) at room temperature of each of cured products of each of the rubber compositions was measured using a type A durometer in accordance with JIS K6253.

Young's Modulus of the Polyamide Resin Composition

A sheet was fabricated from a polyamide resin composition obtained via the process described above using an electric heating press at a temperature of 230° C. A sample was cut from the sheet having the following dimensions: 5 mm (width)×80 mm (length)×0.15 mm (thickness) and this was used as the sample.

The Young's modulus of the obtained sample was measured in accordance with JIS K 7161 at a tensile speed of 50 mm/minute.

Manufacturing of the Hose

Hoses were manufactured using the rubber compositions and the polyamide resin compositions of each of the Working Examples and the Comparative Examples.

Specifically, first, the polyamide resin composition obtained as described above was molded by being drawn out on a mandrel (outer diameter: 11 mm) using an extruder so as to form a gas barrier layer having a thickness of 0.1 mm.

Next, using the rubber composition obtained as described above, a rubber layer having a thickness of 1.4 mm was formed on the outer surface of the obtained gas barrier layer. After laminating the rubber layer on the outer surface of the gas barrier layer, the entire body was vulcanized and a hose having only the inner tube layer was obtained. The vulcanization was performed at about 150° C. to 180° C. under vapor pressure. Thus, a hose having a wall thickness of 1.5 mm and an outer diameter of 14 mm was obtained.

Note that in Comparative Example 1-1, the gas barrier layer and the rubber layer were bonded using an adhesive (Chemlok 402X, manufactured by Lord Corporation).

Adhesive Strength of the Rubber Composition/Polyamide Resin Composition

Adhesive strength and rubber sticking when peeling the rubber layer at a peeling speed of 50 mm/minute were measured for each of the hoses obtained as described above.

Here, "adhesive strength" refers to adhesive strength (N) per 25 mm (width). Hoses that displayed an adhesive strength of 40N/25 mm or greater were evaluated as "o", and hoses that displayed an adhesive strength of less than 40N/25 mm were evaluated as "x".

Area and thickness of the rubber sticking was evaluated.

"Rubber sticking (area)" refers to a proportion of the area (%) to which rubber (peeled from the rubber layer) stuck to the gas barrier layer, after the rubber layer had been peeled following the adhesion strength evaluation.

"Rubber sticking (thickness)" refers to a visual evaluation of the thickness of the rubber stuck to the gas barrier layer after the rubber layer had been peeled off. The thickness was evaluated as "thick", "somewhat thick", "thin", and "interface" (meaning that the peeling occurred at the interface between the gas barrier layer and the rubber layer).

In the evaluation of the rubber sticking, cases where rubber sticking was "thick" were evaluated as "o (excellent)", cases where rubber sticking was "somewhat thick" were evaluated as "Δ", and cases where rubber sticking was "thin" or that peeled at the "interface" were evaluated as "x".

Delamination

A hose having an inner diameter of 11 mm, an outer diameter of 14 mm (wall thickness of the hose was 1.5 mm), and a length of 50 cm was manufactured according to the method described above.

Then, a refrigerant (HFC-134a) was injected into the hose and, thereafter, both ends of the hose were capped and sealed. Then, the sealed hose was left to sit in an oven for 24 hours at 90° C. In this case, the refrigerant was encapsulated so as to be 0.6 g/cm$^3$.

Thereafter, following the release of the refrigerant, the hose was immediately put in a 120° C. oven and left to sit for 24 hours.

Then, the hose was cut in half (lengthwise) and a state of peeling of the resin (gas barrier layer) was confirmed. Hoses in which the resin did not peel were evaluated as "o", and hoses in which the resin did peel were evaluated as "x".

As is clear from the results shown in Tables 1 and 2 (in FIGS. 2a-6c), in Comparative Example 1-1, where the gas barrier layer and the rubber layer were bonded using an adhesive, rubber sticking was thin, the resin peeled in the delamination test, and the adhesion between the gas barrier layer and the rubber layer was insufficient.

In Comparative Example 1-2, where the rubber composition did not comprise the hydrotalcite, it was found that there was no rubber sticking because interfacial debonding occurred; and that the adhesion between the gas barrier layer and the rubber layer was insufficient. In Comparative Examples 2 and 4, where the rubber composition did not comprise the hydrotalcite, it was found that rubber sticking was thin or somewhat thick; and that the adhesion between the gas barrier layer and the rubber layer was insufficient. In Comparative Example 3, where the rubber composition did not comprise the hydrotalcite, it was found that the adhesive strength between the gas barrier layer and the rubber layer (adhesive strength between the polyamide resin composition and the rubber composition; same hereinafter) was low and adhesion was inferior.

In Comparative Example 5, where the content of the hydrotalcite exceeded 8 parts by mass per 100 parts by mass of the raw rubber, it was found that while the adhesion was superior, the tensile strength ($T_B$) of the rubber layer was less than 6 MPa and, thus, was unusable as a hose for transporting refrigerant.

In Comparative 6, where the content of the hydrotalcite was less than 1 part by mass per 100 parts by mass of the raw rubber, it was found that rubber sticking was somewhat thick, and that the adhesion between the gas barrier layer and the rubber layer was insufficient.

Note that Comparative Example 2 corresponds to the embodiment described in Japanese Unexamined Patent Application Publication No. 2000-220770A and Comparative Example 4 corresponds to the embodiment described in Japanese Patent No. 4365454.

In contrast, in Working Examples 1 to 14, 20, and 21, the adhesive strength between the gas barrier layer and the rubber layer was high, adhesion was superior, and the Young's modulus of the gas barrier layer was appropriate.

Particularly, in Working Examples 3 to 14, 20, and 21, where the raw rubber comprised the BIMS, Br-IIR as the halogenated butyl rubber, and the EPDM, adhesive strength was high and adhesion was superior.

Additionally, the resin did not peel in the delamination tests for Working Examples 1 to 14, 20, and 21.

In a comparison of Working Example 4 and Working Example 20, it was found that Working Example 4, where the hydrotalcite that was not surface treated was comprised, had higher adhesive strength between the gas barrier layer and the rubber layer and superior adhesion than Working Example 20, where the hydrotalcite that was surface treated was comprised. The same held true in a comparison of Working Example 10 and Working Example 21.

Additionally, in Working Example 20, mechanical strength of the rubber composition such as tensile strength ($T_B$; MPa), elongation at breaking ($E_B$; %), 100% modulus ($M_{100}$), and hardness was higher than in Working Example 4. The same held true in a comparison of Working Example 10 and Working Example 21.

In a comparison of Working Example 4 and Working Example 10, it was found that in Working Example 10, where both the rubber composition and the polyamide resin composition comprised the hydrotalcite, had higher adhesive strength between the gas barrier layer and the rubber layer and superior adhesion than Working Example 4. The same held true in a comparison of Working Example 20 and Working Example 21.

Working Example 15 <Manufacture of Hose 1 Comprising a Reinforcing Layer and an Outer Tube Layer>

A hose was manufactured by extruding a gas barrier layer having a thickness of 0.15 mm using the polyamide resin composition 1 of Working Example 4 with a resin extruder on a surface of a mandrel made from thermoplastic resin having an outer diameter of 11 mm (extrusion temperature: 240° C.). A rubber layer (rubber composition of Working Example 4) having a thickness of 1.2 mm was extruded on a surface of the gas barrier layer to form the inner tube layer. A two-layer reinforcing layer, made by alternately winding polyethylene terephthalate (PET) fiber having a gross thread thickness of 80,000 dtex in a helical manner, was formed. A cover rubber layer (the same butyl rubber composition A described below was used) having a thickness of 1.0 mm was extruded on the reinforcing layer and formed into an extruded outer tube layer. Furthermore, a conventional polymethylpentene resin was extruded on the extruded outer tube layer and formed into a cover skin. The obtained tube shaped laminate was vulcanized for 100 minutes at 160° C. and, thereafter, the cover skin and the mandrel were removed from the tube shaped laminate. The obtained hose is referred to as hose 1. The hose 1 has superior adhesion between the gas barrier layer and the rubber layer.

Butyl rubber composition A (cover rubber layer): Composition comprising 100 parts by mass of butyl rubber, 80 parts by mass of carbon black (HAF), 3 parts by mass of stearic acid, 10 parts by mass of paraffin oil, 2 parts by mass of zinc oxide, and 8 parts by mass of brominated alkyl phenol formaldehyde resin.

Working Example 16 <Manufacture of Hose 2>

Other than replacing the polyamide resin composition 1 used in Working Example 4 with the polyamide resin composition 2 used in Working Example 7, a hose 2 was manufactured the same as the hose 1 of Working Example 15. The hose 2 has superior adhesion between the gas barrier layer and the rubber layer.

Working Example 17 <Manufacture of Hose 3>

Other than replacing the polyamide resin composition 1 used in Working Example 4 with the polyamide resin composition 3 used in Working Example 10, a hose 3 was manufactured the same as the hose 1 of Working Example 15. The hose 3 has superior adhesion between the gas barrier layer and the rubber layer.

Working Example 18 <Manufacture of Hose 4>

Other than replacing the rubber composition used in Working Example 10 with the rubber composition used in Working Example 9, a hose 4 was manufactured the same as the hose 3 of Working Example 17. The hose 4 had superior adhesion between the gas barrier layer and the rubber layer.

Working Example 19 <Manufacture of Hose 5>

Other than replacing the rubber composition used in Working Example 10 with the rubber composition used in Working Example 11, a hose 5 was manufactured the same as the hose 3 of Working Example 17. The hose 5 had superior adhesion between the gas barrier layer and the rubber layer.

What is claimed is:

1. A hose for transporting refrigerant comprising an inner tube layer including a gas barrier layer and a rubber layer adjacent to an outer surface of the gas barrier layer, wherein
   the rubber layer comprises a rubber composition comprising from 1 to 15 parts by mass of an alkylphenol-formaldehyde resin, from 1 to 8 parts by mass of a hydrotalcite and from 30 to 80 parts by mass of a carbon black having an $N_2SA$ that is greater than or equal to 75 $m^2/g$ and a DBP absorption number that is greater than or equal to 90 $cm^3/100$ g per 100 parts by mass of a raw rubber;
   the raw rubber comprises at least one selected from the group consisting of a BIMS and a butyl rubber and/or a halogenated butyl rubber, which is a copolymer rubber; and
   the gas barrier layer comprises a polyamide resin composition comprising a modified polyamide obtained by blending a polyamide and a carboxyl group-containing modified polyolefin.

2. The hose for transporting refrigerant according to claim 1, wherein the raw rubber comprises a BIMS, a butyl rubber and/or a halogenated butyl rubber, which is a copolymer rubber and, also, an EPDM; and
   in the raw rubber, a content of the BIMS is from 5 to 40 parts by mass, a total of contents of the BIMS and the copolymer rubber is from 20 to 80 parts by mass, and a content of the EPDM is from 80 to 20 parts by mass.

3. The hose for transporting refrigerant according to claim 1, wherein the polyamide resin composition further comprises a hydrotalcite.

4. The hose for transporting refrigerant according to claim 3, wherein a content of the hydrotalcite comprised in the polyamide resin composition is from 0.5 to 20 parts by mass per 100 parts by mass of the modified polyamide.

5. The hose for transporting refrigerant according to claim 1, wherein the copolymer rubber is a halogenated butyl rubber.

6. The hose for transporting refrigerant according to claim 1, wherein the polyamide is at least one selected from the group consisting of polyamide 6, polyamide 11, polyamide 12, polyamide 4-6, polyamide 6-6, polyamide 6-10, polyamide 6-12, polyamide MXD-6, and copolymers of two or more of these.

7. The hose for transporting refrigerant according to claim 1, wherein the hydrotalcite comprised in the rubber composition is not surface treated.

8. The hose for transporting refrigerant according to claim 1, wherein the hydrotalcite comprised in the rubber composition is produced by calcining a raw hydrotalcite.

9. The hose for transporting refrigerant according to claim 1, wherein an adhesive layer is not interposed between the gas barrier layer and the rubber layer.

10. The hose for transporting refrigerant according to claim 1, wherein the gas barrier layer and the rubber layer are directly bonded.

11. The hose for transporting refrigerant according to claim 1, wherein a reinforcing layer is provided on the inner tube layer and an outer tube layer is provided on the reinforcing layer.

12. The hose for transporting refrigerant according to claim 3, wherein the hydrotalcite comprised in the polyamide resin composition is not surface treated.

13. The hose for transporting refrigerant according to claim 3, wherein the hydrotalcite comprised in the polyamide resin composition is produced by calcining a raw hydrotalcite.

* * * * *